United States Patent
Hassan et al.

(10) Patent No.: US 9,300,587 B1
(45) Date of Patent: Mar. 29, 2016

(54) MANAGING CONNECTED USERS OF A WIRELESS COMMUNICATION SYSTEM

(71) Applicant: Sprint Spectrum LP, Overland Park, KS (US)

(72) Inventors: Kafi Hassan, Fairfax, VA (US); Nawara Omary, Vienna, VA (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 146 days.

(21) Appl. No.: 14/135,341

(22) Filed: Dec. 19, 2013

(51) Int. Cl.
*H04L 12/803* (2013.01)

(52) U.S. Cl.
CPC .................................. *H04L 47/125* (2013.01)

(58) Field of Classification Search
None
See application file for complete search history.

(56) References Cited

U.S. PATENT DOCUMENTS

| | | | |
|---|---|---|---|
| 2004/0203806 A1* | 10/2004 | Craig et al. | 455/450 |
| 2010/0027502 A1* | 2/2010 | Chen et al. | 370/330 |
| 2011/0149782 A1 | 6/2011 | Townley et al. | |
| 2012/0082115 A1* | 4/2012 | Puthenpura et al. | 370/329 |

* cited by examiner

*Primary Examiner* — Noel Beharry
*Assistant Examiner* — Raza Ansari (57) ABSTRACT

A first number of wireless devices in communication with an access node over a first frequency band is determined. A total bandwidth and a spectral efficiency of the first frequency band are determined, and a throughput provided to each of the first number of wireless devices in the communication between the access node and the first number of wireless devices is calculated. Based on the total bandwidth of the first frequency band, the spectral efficiency of the first frequency band, and the throughput provided to each of the first number of wireless devices, a second number of wireless devices permitted to communicate with the access node over the first frequency band is determined. To determine a third number of wireless devices permitted to communicate with the access node over the first frequency band, the throughput provided to each of the first number of wireless devices is adjusted.

20 Claims, 7 Drawing Sheets

MANAGING CONNECTED USERS OF A WIRELESS COMMUNICATION SYSTEM

TECHNICAL BACKGROUND

Communication systems can provide wireless devices with a variety of communication services including data services, interconnect services, and push-to-talk communication services, among others. When a communication session is established between an access node and a wireless device, communication resources such as frequency bands, channel bandwidth, backhaul resources, processing resources, and the like are committed for the communication session. Communication resources between an access node and a wireless device are finite, and an access node may reach a maximum capability of providing communication services to a plurality of wireless devices beyond which new requests for communication resources may be rejected. Where an access node attempts to meet a minimum level of communication services for each wireless device, limitations on communication resources can become more critical. Thus, balancing available bandwidth and service quality is important to provide a minimum level of service performance.

OVERVIEW

In operation, a first number of wireless devices in communication with an access node over a first frequency band are determined when a loading of the first frequency band meets a loading threshold. A total bandwidth of the first frequency band is calculated, and a spectral efficiency of the first frequency band is determined based on a communication between the access node and the first number of wireless devices. A throughput provided to each of the first number of wireless devices in the communication between the access node and the first number of wireless devices is calculated. Then, a second number of wireless devices permitted to communicate with the access node over the first frequency band is determined based on the total bandwidth of the first frequency band, the spectral efficiency of the first frequency band, and the throughput provided to each of the first number of wireless devices. To determine a third number of wireless devices permitted to communicate with the access node over the first frequency band, the throughput provided to each of the first number of wireless devices is adjusted.

DETAILED DESCRIPTION

Figure 1:
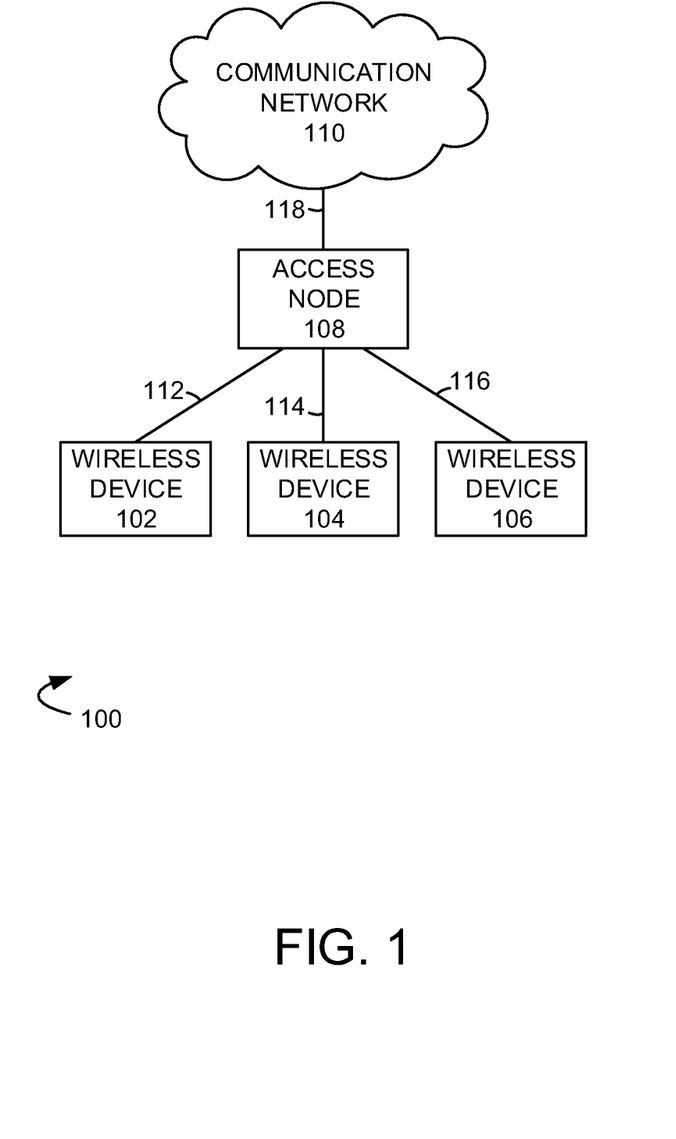
FIG. 1 illustrates an exemplary communication system to manage connected users of a wireless communication system.

FIG. 1 illustrates an exemplary communication system 100 to manage connected users of a wireless communication system comprising wireless devices 102, 104, and 106, access node 108, and communication network 110. Examples of wireless devices 102-106 can comprise a cell phone, a smart phone, a computing platform such as a laptop, palmtop, or tablet, a personal digital assistant, or an internet access device, including combinations thereof. Wireless devices 102, 104, and 106 can communicate with access node 108 over communication links 112, 114, and 116, respectively. It will be appreciated that the illustration of three wireless devices is merely exemplary, and more or fewer wireless device can communicate with access node 108. In an embodiment, wireless communication links 112, 114, and 116 can comprise communication links provided over a first frequency band, which frequency band can be shared by wireless device 102, 104, and 106.

Access node 108 is a network node capable of providing wireless communications to wireless devices 102-106, and can be, for example, a base transceiver station, a radio base station, an eNodeB device, or an enhanced eNodeB device. Access node 108 is in communication with communication network 110 over communication link 118.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless device 102-106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

When a communication session is established between an access node and a wireless device, communication resources including frequency bands, channel bandwidth, backhaul resources, processing resources, and the like are assigned for the communication session. A maximum capability of the access node to provide communication services to a plurality of wireless devices can be reached, in particular when the access node attempts to meet a minimum level of communication services for each wireless device, and limitations on communication resources can become more critical.

To adjust the number of wireless devices connected to access node 108 to improve access node performance and capacity, in operation, when a loading of a first frequency band meets a loading threshold, a first number of wireless devices (e.g., wireless device 102-106) in communication with access node 108 over the first frequency band is determined. Further, the total bandwidth of the first frequency band is calculated, and a spectral efficiency of the first frequency band is determined based on a communication between access node 108 and the first number of wireless devices. Next, a throughput is calculated for each of the first number of wireless devices of the communication between the access node and the first number of wireless devices. Based on the total bandwidth of the first frequency band, the spectral efficiency of the first frequency band, and the throughput for each of the first number of wireless devices, a first number of wireless devices permitted to communicate with access node 108 is determined. The throughput for each of the first number of wireless devices is then adjusted to determine a second number of wireless devices permitted to communicate with access node 108. The above can also be utilized on a per-frequency band basis when access node 108 is configured to provide wireless communications over more than one frequency band. Thus, the number of wireless devices connected to access node 108 can be adjusted to improve overall access node performance and capacity.

Figure 2:
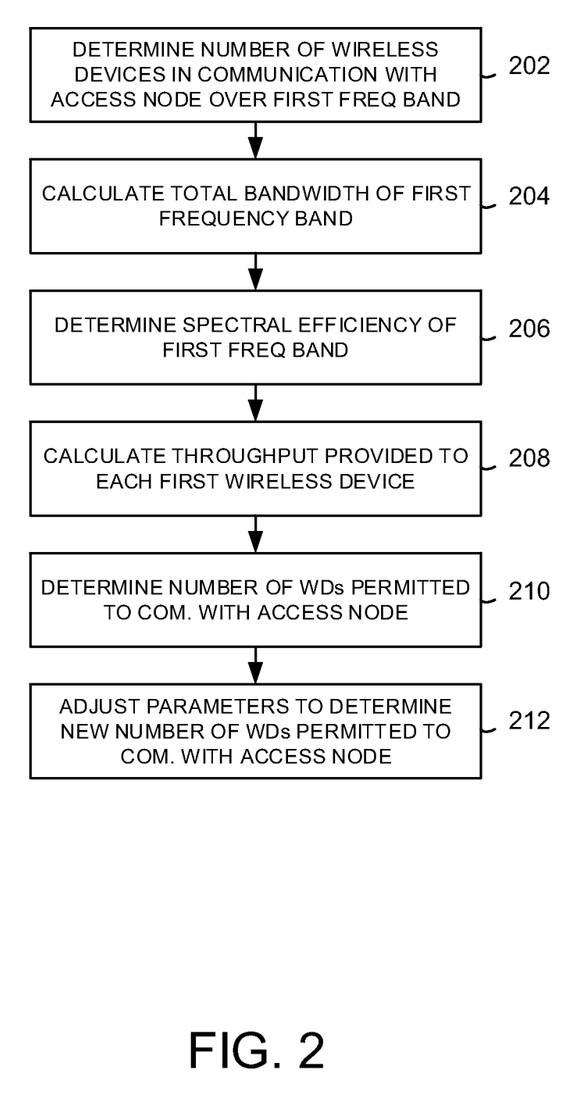
FIG. 2 illustrates an exemplary method of managing connected users of a wireless communication system.

FIG. 2 illustrates an exemplary method of managing connected users of a wireless communication system. In operation 202, a first number of wireless devices in communication with an access node over a first frequency band is determined when a loading of the first frequency band meets a loading threshold. For example, a plurality of wireless devices (such as wireless devices 102-106) can use the first frequency band to communicate with access node 108. The loading of the first frequency band can comprise, for example, a utilization or requested utilization of communication resources, an amount of data that is sent to or from the wireless device over each communication link, a number of physical resource blocks or other wireless communication link resource utilized by the wireless device, a requested amount of data to be sent to or from the wireless devices (as may be determined from a buffer status report or similar request for wireless communication link resources), an amount of data buffered for transmission to or from the wireless devices, and the like, including combinations thereof. A loading of a frequency band can comprise an average loading (actual or estimated) during a time period, an aggregate loading (actual or estimated) during a time period, a number of times that a loading meets a loading threshold during a time period (actual or estimated), and so forth.

Next, a total bandwidth of the first frequency band is calculated (operation 204). The total bandwidth of the first frequency can vary based on, among other things, the frequency band (e.g., 800 MHz, 1.9 GHz, 2.5 GHz, and the like), the frequency spacing of channels within the frequency band, the presence and size of guard bands, a modulation scheme used for data traffic in the frequency band (e.g., time division duplexing (TDD), frequency division duplexing (FDD), and others), and so forth.

Then, based on a communication between the access node and the first number of wireless devices, a spectral efficiency of the first frequency band is determined (operation 206). The communication can comprise data communications between each wireless device 102-106 and access node 108. The data communications can comprise bearer data, control signaling, or a combination thereof. The communication can further comprise a data rate, or a throughput, between access node 108 and each wireless device 102-106. For example, the communication can comprise a number of bits or bytes of data transmitted, or successfully transmitted, between access node 108 and each wireless device 102-106 during a time period, such as bits per second. Based on the communication between access node 108 and each wireless device 102-106, a spectral efficiency can be determined over the first frequency band, such as a number of bits per second transmitted over the bandwidth of the first frequency band (e.g., bits per second divided by the total bandwidth of the first frequency band).

Next, in operation 208, a throughput provided to each of the first number of wireless devices in the communication between the access node and the first number of wireless devices. For example, each wireless device 102, 104, and 106 can require a minimum throughput to and from access node 108. The throughput provided to each wireless device can be based on an application requirement of an application running on each wireless device. The application requirement can comprise a minimum data rate, a maximum permitted data delay, a minimum throughput, a maximum error rate, a maximum data loss rate, and the like, of an application running on a wireless device. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application), and the like. The application requirement can also be evaluated based on the utilization or requested utilization of communication link resources by the application, for example, an amount of data sent from or to the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. In an embodiment, the application requirement can be expressed as a number of bits or bytes of data required to be successful transmitted, or successfully transmitted, between access node 108 and each wireless device 102-106 during a time period, such as bits per second.

Based on the total bandwidth of the first frequency band, the spectral efficiency of the first frequency band, and the throughput provided to each of the first number of wireless devices, a second number of wireless devices permitted to communicate with the access node over the first frequency band is determined (operation 210). For example, the first number of wireless devices permitted to communication with access node 108 can be expressed as a total number of connected wireless devices. A connected wireless device can comprise a wireless device in active communication with access node 108, for example, a wireless device conducting a data, voice, or other communication session, a wireless device downloading or uploading a streamed data from or to access node 108, a wireless device in RRC_Connected mode, and the like. A connected wireless device can also comprise a wireless device in a low power or idle mode (for example, a wireless device in RRC_Idle mode and the like). Because it can be anticipated that such wireless devices may receive a paging message indicating incoming data or an incoming call request, or may otherwise exit the idle mode and request communication resources from access node 108, and the like, a wireless device in a low power mode or idle mode may be included in the connected wireless devices.

The throughput provided to each of the first number of wireless devices is then adjusted to determine a third number of wireless devices permitted to communicate with the access node over the first frequency band (operation 212). For example, to increase the number of wireless devices permitted to communicate with access node 108, a throughput provided to each of the first number of wireless devices may be decreased. Additionally, or alternatively, it may be decided to provide a certain level of throughput to each of the first number of wireless devices over the first frequency band, and the level of throughput provided to each of the first number of wireless devices may be increased, which may decrease the number of wireless devices permitted to communicate with access node 108 over the first frequency band.

In an embodiment, the total number of connected users permitted to communicate with an access node can be expressed as $$CU = (BW \times SE \times TH)/TP_{cu} \qquad \text{[Equation 1]}$$

where CU represents the total number of connected users permitted to communicate with an access node, BW represents the total bandwidth of a frequency band, SE represents the spectral efficiency of the frequency band, Th represents a loading threshold, and $TP_{cu}$ represents the throughput provided to each connected user.

The total number of connected users permitted to communicate with an access node can be determined based on a time or time period. For example, during a time of known high network resource usage or demand, the total number of connected users permitted to communicate with an access node can be determined and used to manage the utilization and efficiency of communication resources. The high network resource usage or demand can be determined to be relatively local or to be in known locations. For example, the time can comprise a commuting time (such as rush hour), and the location can comprise a highway, a train line, an airport, or another major commuter access route. As another example, the time and location can comprise the time and place of a large scale public event, such as a concert, a political rally, a sporting event, or another large gathering. The total number of connected users permitted to communicate with an access node can be determined at an access node (such as access node 108), for example, at a scheduler unit or scheduling module of the access node. The total number of permitted connected users can also be determined at another network element of communication system 100, such as a network controller (e.g., a mobility management entity (MME), a mobile switching center (MSC), a dispatch call controller (DCC), and the like), a gateway or other network element (e.g., an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment), or another network element, including combinations of the foregoing.

The total number of connected users can be increased to provide communication resources to a larger number of wireless devices. For example, at a sporting event, the throughput provided to each wireless device can be decreased to increase the total number of connected users permitted to communicate with an access node. The increase in the total number of permitted connected users can be performed for a limited time period, such as the duration of the sporting event. Additionally, or alternatively, a minimum level of throughput can be provided to connected users, which may place a constraint on the total number of connected users permitted to communicate with an access node. For example, where wireless devices are associated with a high network priority, a minimum throughput per wireless device can be provided, which may restrict the total number of connected users permitted to communicate with an access node. A high network priority can comprise an increased priority for the assignment of a communication link, the provision of communication resources (e.g., bandwidth, slots, channels, etc.), scheduling resources, routing priority in a backhaul of a communication system, and the like. The minimum throughput per wireless device can be provided can be performed for a limited time period, such as a duration of an emergency (to provide a minimum throughput for emergency responder wireless devices).

Thus, in order to improve access node performance and capacity, and to provide a certain level of communication service quality, or to provide for a certain level of user experience, the number of active and/or idle connected wireless devices permitted to communicate with access node 108 can be adjusted.

Figure 3:
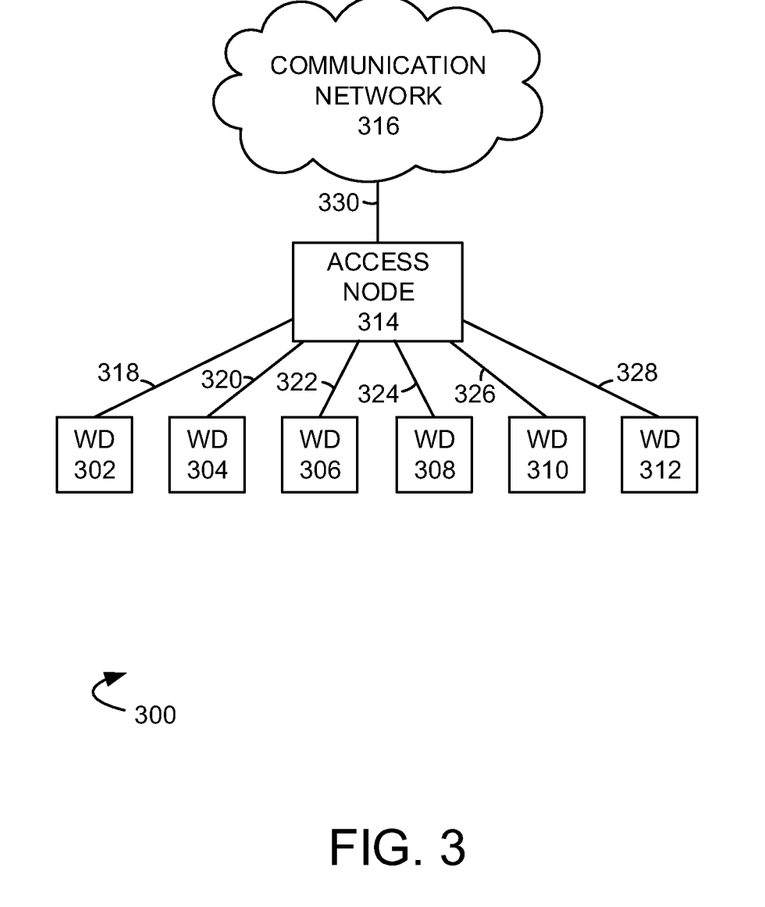
FIG. 3 illustrates another exemplary communication system to manage connected users of a wireless communication system.

FIG. 3 illustrates another exemplary communication system 300 to manage connected users of a wireless communication system comprising wireless devices 302, 304, 306, 308, 310, and 312, access node 314, communication network 316. Examples of wireless devices 302-312 can comprise a cell phone, a smart phone, a computing platform such as a laptop, palmtop, or tablet, a personal digital assistant, or an internet access device, including combinations thereof. Wireless devices 302-312 can communicate with access node 314 over communication links 318, 320, 322, 324, 326, and 328, respectively. It will be appreciated that the illustration of six wireless devices is merely exemplary, and more or fewer wireless device can communicate with access node 314. In an embodiment, wireless communication links 318, 320, and 322 can comprise communication links provided over a first frequency band, which frequency band can be shared by wireless devices 302, 304, and 306, and wireless communication links 324, 326, and 328 can comprise communication links provided over a second frequency band, which frequency band can be shared by wireless devices 308, 310, and 312.

Access node 314 is a network node capable of providing wireless communications to wireless devices 302-312, and can be, for example, a base transceiver station, a radio base station, an eNodeB device, or an enhanced eNodeB device. Access node 314 is in communication with communication network 316 over communication link 330.

Communication network 316 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 316 can be capable of carrying voice information and other data, for example, to support communications by a wireless device such as wireless devices 302-312. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 316 may also comprise a wireless network, including base stations, wireless communication nodes, telephony switches, internet routers, network gateways, computer systems, communication links, or some other type of communication equipment, and combinations thereof.

Communication links 318, 320, 322, 324, 326, 328, and 330 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 314 and communication network 316 which are omitted for clarity, including additional processing nodes, routers, gateways, and physical and/or wireless data links for carrying data among the various network elements.

Figure 4:
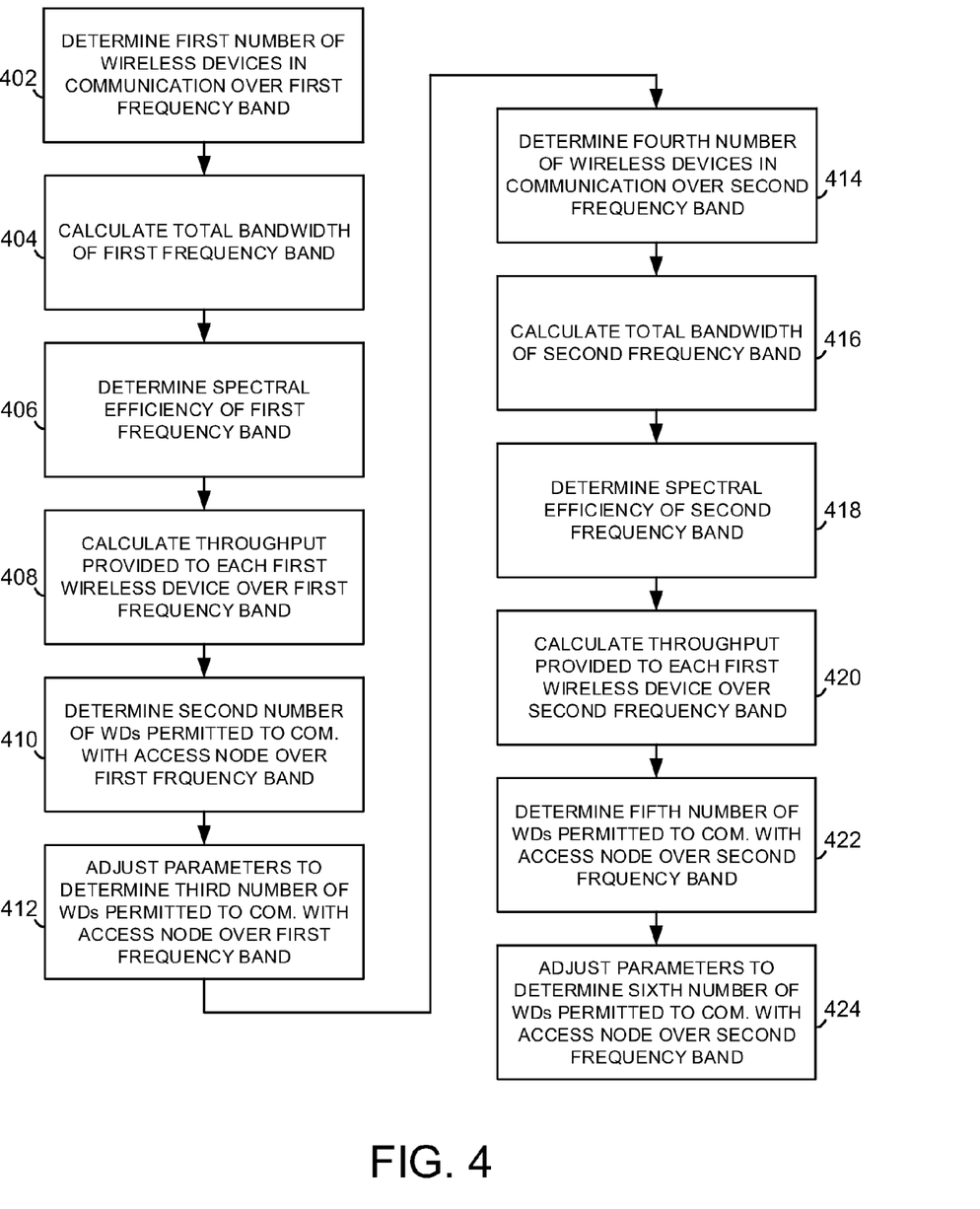
FIG. 4 illustrates another exemplary method of managing connected users of a wireless communication system.

FIG. 4 illustrates another exemplary method of managing connected users of a wireless communication system. In operation 402, a first number of wireless devices in communication with an access node over a first frequency band is determined when a loading of the first frequency band meets a loading threshold. For example, a plurality of wireless devices (such as wireless devices 302-306) can use the first frequency band to communicate with access node 314. The loading of the first frequency band can comprise, for example, a utilization or requested utilization of communication resources, an amount of data that is sent to or from the wireless device over each communication link, a number of physical resource blocks or other wireless communication link resource utilized by the wireless device, a requested amount of data to be sent to or from the wireless devices (as may be determined from a buffer status report or similar request for wireless communication link resources), an amount of data buffered for transmission to or from the wireless devices, and the like, including combinations thereof. A loading of a frequency band can comprise an average loading (actual or estimated) during a time period, an aggregate loading (actual or estimated) during a time period, a number of times that a loading (actual or estimated) meets a loading threshold during a time period, and so forth.

Next, a total bandwidth of the first frequency band is calculated (operation 404). The total bandwidth of the first frequency can vary based on, among other things, the frequency band (e.g., 800 MHz, 1.9 GHz, 2.5 GHz, and the like), the frequency spacing of channels within the frequency band, the presence and size of guard bands, a modulation scheme used for data traffic in the frequency band (e.g., time division duplexing (TDD), frequency division duplexing (FDD), and others), and so forth.

Then, based on a communication between the access node and the first number of wireless devices, a spectral efficiency of the first frequency band is determined (operation 406). The communication can comprise data communications between each wireless device 302-306 and access node 314. The data communications can comprise bearer data, control signaling, or a combination thereof. The communication can further comprise a data rate, or a throughput, between access node 314 and each wireless device 302-306. For example, the communication can comprise a number of bits or bytes of data transmitted, or successfully transmitted, between access node 314 and each wireless device 302-306 during a time period, such as bits per second. Based on the communication between access node 314 and each wireless device 302-306, a spectral efficiency can be determined over the first frequency band, such as a number of bits per second transmitted over the bandwidth of the first frequency band (e.g., bits per second divided by the total bandwidth of the first frequency band).

Next, in operation 408, a throughput provided to each of the first number of wireless devices in communication with the access node is calculated. For example, each wireless device 302, 304, and 306 can require a minimum throughput to and from access node 314. The throughput provided to each wireless device can be based on an application requirement of an application running on each wireless device. The application requirement can comprise a minimum data rate, a maximum permitted data delay, a minimum throughput, a maximum error rate, a maximum data loss rate, and the like, of an application running on a wireless device. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). The application requirement can also be evaluated based on the utilization or requested utilization of communication link resources by the application, for example, an amount of data sent from or to the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. In an embodiment, the application requirement can be expressed as a number of bits or bytes of data required to be successful transmitted, or successfully transmitted, between access node 314 and each wireless device 302-306 during a time period, such as bits per second.

Based on the total bandwidth of the first frequency band, the spectral efficiency of the first frequency band, and the throughput provided to each of the first number of wireless devices, a second number of wireless devices permitted to communicate with the access node over the first frequency band is determined (operation 410). For example, the first number of wireless devices permitted to communication with access node 314 can be expressed as a total number of connected wireless devices. A connected wireless device can comprise a wireless device in active communication with access node 314, for example, a wireless device conducting a data, voice, or other communication session, a wireless device downloading or uploading a streamed data from or to access node 314, a wireless device in RRC_Connected mode, and the like. A connected wireless device can also comprise a wireless device in a low power or idle mode (for example, a wireless device in RRC_Idle mode and the like). Because it can be anticipated that such wireless devices may receive a paging message indicating incoming data or an incoming call request, or may otherwise exit the idle mode and request communication resources from access node 314, and the like, a wireless device in a low power mode or idle mode may be included in the connected wireless devices.

The throughput provided to each of the first number of wireless devices is then adjusted to determine a third number of wireless devices permitted to communicate with the access node over the first frequency band (operation 412). For example, to increase the number of wireless devices permitted to communicate with access node 314, a throughput provided to each of the first number of wireless devices may be decreased. Additionally, or alternatively, it may be decided to provide a certain level of throughput to each of the first number of wireless devices over the first frequency band, and the level of throughput provided to each of the first number of wireless devices may be increased, which may decrease the number of wireless devices permitted to communicate with access node 314 over the first frequency band.

Next, in operation 414, a fourth number of wireless devices in communication with an access node over a second frequency band is determined when a loading of the second frequency band meets a loading threshold. The loading threshold of the second frequency band can be the same threshold, or a different threshold, as the loading threshold for the first frequency band. As an example, a plurality of wireless devices (such as wireless devices 308-312) can use the second frequency band to communicate with access node 314. The loading of the second frequency band can be determined analogously to the loading of the first frequency band.

A total bandwidth of the second frequency band is then calculated (operation 416). The total bandwidth of the second frequency can vary based on, among other things, the frequency band (e.g., 800 MHz, 1.9 GHz, 2.5 GHz, and the like), the frequency spacing of channels within the frequency band, the presence and size of guard bands, a modulation scheme used for data traffic in the frequency band (e.g., time division duplexing (TDD), frequency division duplexing (FDD), and others), and so forth.

Then, based on a communication between the access node and the fourth number of wireless devices, a spectral efficiency of the second frequency band is determined (operation 418). The communication can comprise data communications between each wireless devices 308-312 and access node 314. The data communications can comprise bearer data, control signaling, or a combination thereof. The communication can further comprise a data rate, or a throughput, between access node 314 and each wireless devices 308-312. For example, the communication can comprise a number of bits or bytes of data transmitted, or successfully transmitted, between access node 314 and each wireless devices 308-312 during a time period, such as bits per second. Based on the communication between access node 314 and each wireless device 308-312, a spectral efficiency can be determined over the second frequency band, such as a number of bits per second transmitted over the bandwidth of the second frequency band (e.g., bits per second divided by the total bandwidth of the second frequency band).

Next, in operation 420, a throughput provided to each of the fourth number of wireless devices in communication with the access node is calculated. For example, each wireless device 308, 310, and 312 can require a minimum throughput to and from access node 314. The throughput provided to each wireless device can be based on an application requirement of an application running on each wireless device. The application requirement can comprise a minimum data rate, a maximum permitted data delay, a minimum throughput, a maximum error rate, a maximum data loss rate, and the like, of an application running on a wireless device. The application requirement can also be determined based on an application type, a utilization or requested utilization of communication link resources by the application, and the like, including combinations thereof. In an embodiment, the application requirement can be expressed as a number of bits or bytes of data required to be successful transmitted, or successfully transmitted, between access node 314 and each wireless device 308-312 during a time period, such as bits per second.

Based on the total bandwidth of the second frequency band, the spectral efficiency of the second frequency band, and the throughput provided to each of the fourth number of wireless devices, a fifth number of wireless devices permitted to communicate with the access node over the second frequency band is determined (operation 422). For example, the fifth number of wireless devices permitted to communication with access node 314 can be expressed as a total number of connected wireless devices. A connected wireless device can comprise a wireless device in active communication with access node 314 or in a low power or idle mode.

The throughput provided to each of the fourth number of wireless devices is then adjusted to determine a sixth number of wireless devices permitted to communicate with the access node over the second frequency band (operation 424). For example, to increase the number of wireless devices permitted to communicate with access node 314, a throughput provided to each of the fourth number of wireless devices may be decreased. Additionally, or alternatively, it may be decided to provide a certain level of throughput to each of the fourth number of wireless devices over the second frequency band, and the level of throughput provided to each of the fourth number of wireless devices may be increased, which may decrease the number of wireless devices permitted to communicate with access node 314 over the second frequency band.

In an embodiment, the total number of connected users permitted to communicate with an access node over a frequency band can be expressed as $$CU_f = (BW_f \times SE_f \times TH) / TP_{cu} \quad \text{[Equation 2]}$$

where CU represents the total number of connected users permitted to communicate with an access node over a frequency band f, BW represents the total bandwidth of frequency band f, SE represents the spectral efficiency of frequency band f, Th represents a loading threshold (which may be specific to the frequency band, the access node, or both), and $TP_{cu}$ represents the throughput provided to each connected user over frequency band f.

The total number of connected users permitted to communicate with an access node over a frequency band can be determined based on a time or time period. For example, during a time of known high network resource usage or demand, the total number of connected users permitted to communicate with an access node can be determined and used to manage the utilization and efficiency of communication resources. The total number of permitted connected users can be determined on a per-frequency band basis. The total number of connected users can be increased per frequency band to provide communication resources to a larger number of wireless devices. Additionally, or alternatively, a minimum level of throughput per frequency band can be provided to connected users, which may place a constraint on the total number of connected users permitted to communicate with an access node over each frequency band.

Thus, in order to improve access node performance and capacity over two (or more frequency bands), and to provide a certain level of communication service quality, or to provide for a certain level of user experience, the number of active and/or idle connected wireless devices permitted to communicate with access node 314 can be adjusted. Further, the number of wireless devices permitted to communicate with access node 314 can be adjusted independently for each frequency band used by access node 314.

Figure 5:
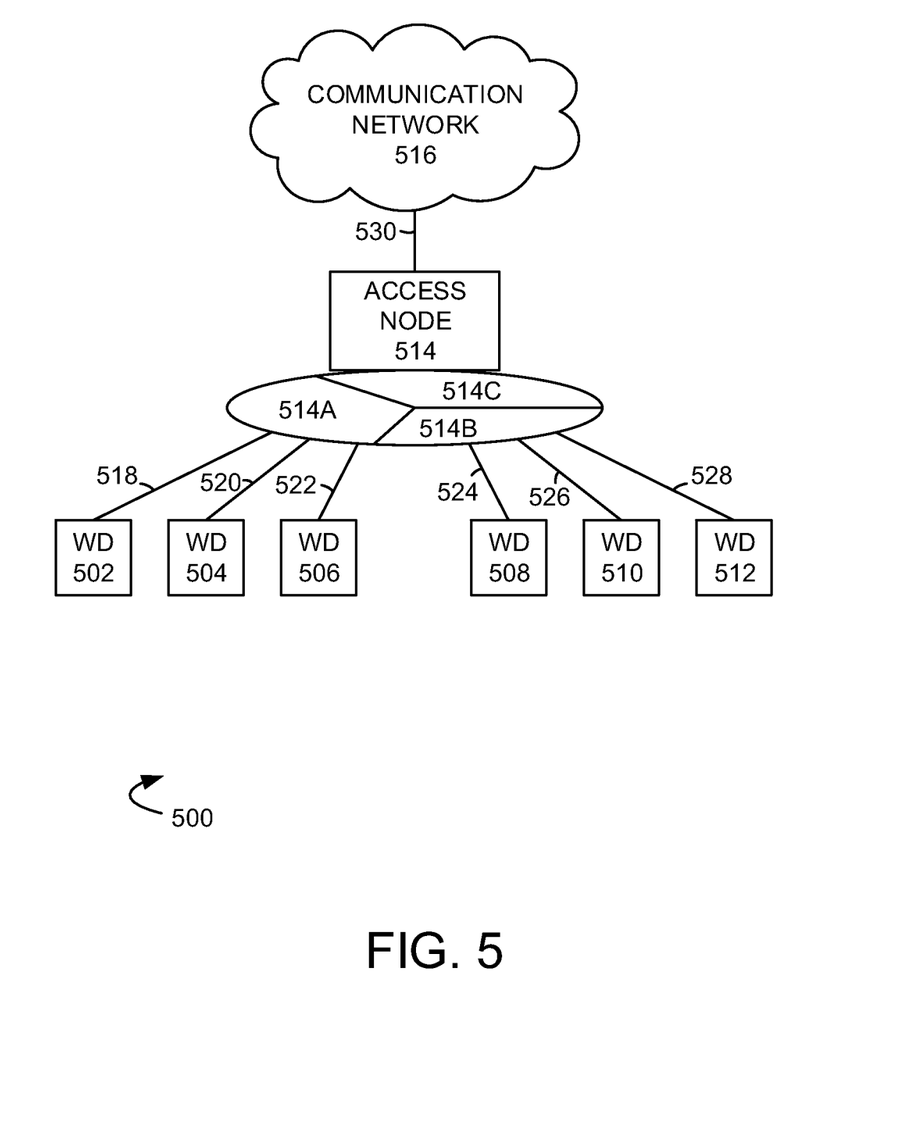
FIG. 5 illustrates another exemplary communication system to manage connected users of a wireless communication system.

FIG. 5 illustrates another exemplary communication system 500 to manage connected users of a wireless communication system comprising wireless devices 502, 504, 506, 508, 510 and 512, access node 514, communication network 516. Examples of wireless devices 502-512 can comprise a cell phone, a smart phone, a computing platform such as a laptop, palmtop, or tablet, a personal digital assistant, or an internet access device, including combinations thereof. Wireless devices 502-512 can communicate with access node 514 over communication links 518, 520, 522, 524, 526, and 528, respectively. It will be appreciated that the illustration of six wireless devices is merely exemplary, and more or fewer wireless device can communicate with access node 514. In an embodiment, wireless communication links 518, 520, and 522 can comprise communication links provided over a first frequency band in a first sector of access node 514, which frequency band can be shared by wireless devices 502, 504, and 506, and wireless communication links 524, 526, and 528 can comprise communication links provided over the first frequency band in a second sector of access node 514, which frequency band can be shared by wireless devices 508, 510, and 512.

Access node 514 is a network node capable of providing wireless communications to wireless devices 502-512, and can be, for example, a base transceiver station, a radio base station, an eNodeB device, or an enhanced eNodeB device. Access node 514 may comprise a coverage area which is logically divided into sectors such as sectors 514A, 514B, and 514C. Although three sectors 514A, 514B, and 514C are illustrated in FIG. 5, an access node may comprise more or fewer sectors. Access node 514 can comprise one or more transceiver devices in each sector to enable access node 514 to communicate with wireless devices in each sector independently of communication with wireless devices in other sectors. For example, wireless communication links 518, 520, and 522 can comprise communication links provided over a first frequency band in a first sector of access node 514 (e.g., sector 514A), which frequency band can be shared by wireless devices 502, 504, and 506, and wireless communication links 524, 526, and 528 can comprise communication links provided over the first frequency band in a second sector of access node 514 (e.g., sector 514B), which frequency band can be shared by wireless devices 508, 510, and 512. Access node 514 is in communication with communication network 316 over communication link 530.

Communication network 516 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 516 can be capable of carrying voice information and other data, for example, to support communications by a wireless device such as wireless devices 502-512. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 516 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 516 may also comprise a wireless network, including base stations, wireless communication nodes, telephony switches, internet routers, network gateways, computer systems, communication links, or some other type of communication equipment, and combinations thereof.

Communication links 518, 520, 522, 524, 526, 528, and 530 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 514 and communication network 516 which are omitted for clarity, including additional processing nodes, routers, gateways, and physical and/or wireless data links for carrying data among the various network elements.

Figure 6:
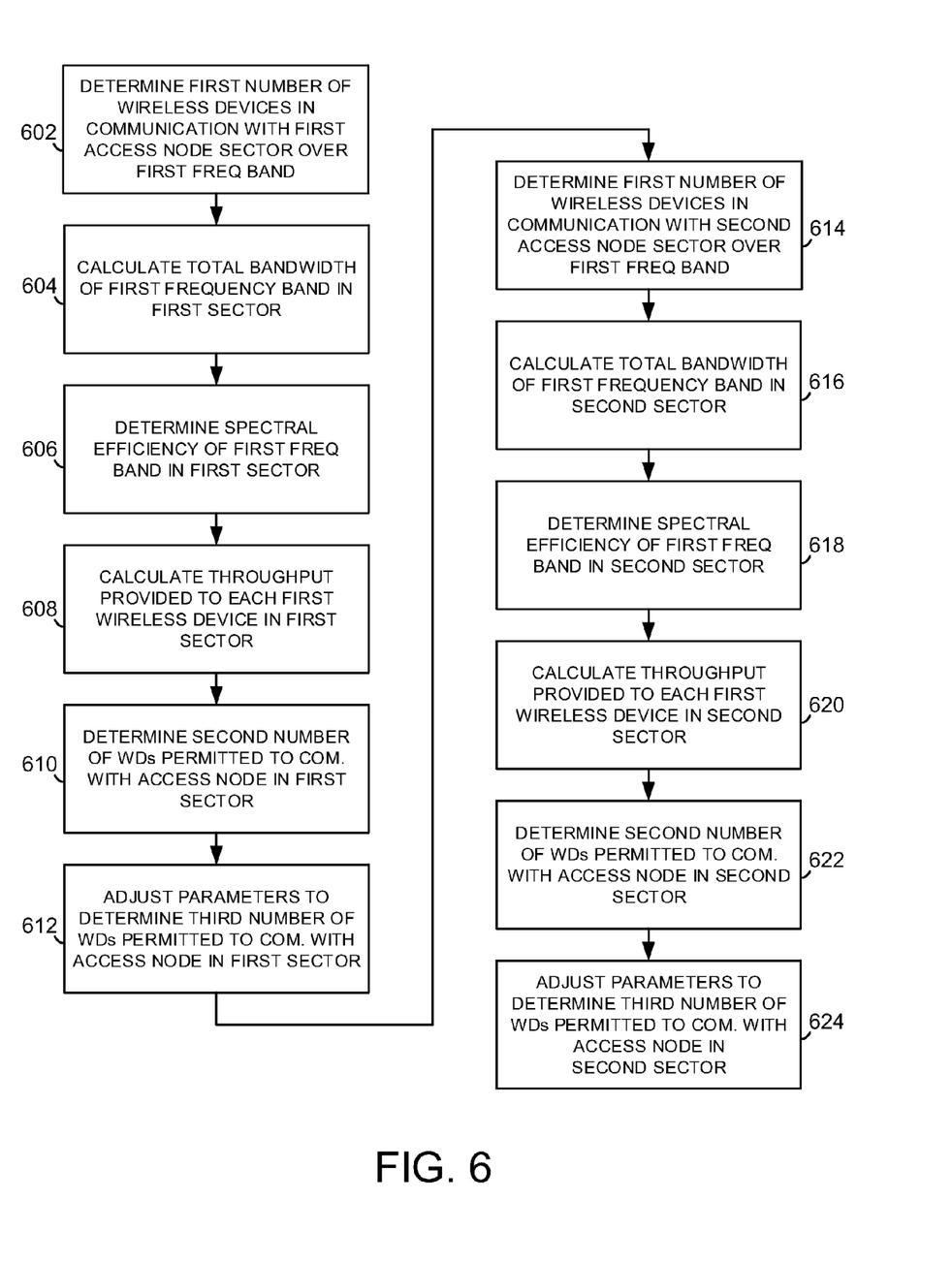
FIG. 6 illustrates another exemplary method of managing connected users of a wireless communication system.

FIG. 6 illustrates another exemplary method of managing connected users of a wireless communication system. In operation 602, a first number of wireless devices in communication with an access node over a first frequency band in a first sector of the access node is determined when a loading of the first frequency band in the first sector meets a loading threshold. For example, a plurality of wireless devices (such as wireless devices 502-506) can use the first frequency band to communicate with access node 514. The loading of the first frequency band in the first sector can comprise, for example, a utilization or requested utilization of communication resources, an amount of data that is sent to or from the wireless device over each communication link, a number of physical resource blocks or other wireless communication link resource utilized by the wireless device, a requested amount of data to be sent to or from the wireless devices (as may be determined from a buffer status report or similar request for wireless communication link resources), an amount of data buffered for transmission to or from the wireless devices, and the like, including combinations thereof. A loading of a frequency band can comprise an average loading (actual or estimated) during a time period, an aggregate loading (actual or estimated) during a time period, a number of times that a loading (actual or estimated) meets a loading threshold during a time period, and so forth.

Next, a total bandwidth of the first frequency band in the first sector is calculated (operation 604). The total bandwidth of the first frequency in the first sector can vary based on, among other things, the frequency band (e.g., 800 MHz, 1.9 GHz, 2.5 GHz, and the like), the frequency spacing of channels within the frequency band, the presence and size of guard bands, a modulation scheme used for data traffic in the frequency band (e.g., time division duplexing (TDD), frequency division duplexing (FDD), and others), and so forth.

Then, based on a communication between the access node and the first number of wireless devices, a spectral efficiency of the first frequency band in the first sector is determined (operation 606). The communication can comprise data communications between each wireless device 502-506 and access node 514. The data communications can comprise bearer data, control signaling, or a combination thereof. The communication can further comprise a data rate, or a throughput, between access node 514 and each wireless device 502-506. For example, the communication can comprise a number of bits or bytes of data transmitted, or successfully transmitted, between access node 514 and each wireless device 502-506 during a time period, such as bits per second. Based on the communication between access node 514 and each wireless device 502-506, a spectral efficiency can be determined over the first frequency band in the first sector, such as a number of bits per second transmitted over the bandwidth of the first frequency band in the first sector (e.g., bits per second divided by the total bandwidth of the first frequency band in the first sector).

Next, in operation 608, a throughput provided to each of the first number of wireless devices in communication with the access node in the first sector is calculated. For example, each wireless device 502, 504, and 506 can require a minimum throughput to and from access node 514. The throughput provided to each wireless device can be based on an application requirement of an application running on each wireless device. The application requirement can comprise a minimum data rate, a maximum permitted data delay, a minimum throughput, a maximum error rate, a maximum data loss rate, and the like, of an application running on a wireless device. The application requirement can also be determined based on the application type and/or the utilization or requested utilization of communication link resources by the application. In an embodiment, the application requirement can be expressed as a number of bits or bytes of data required to be successful transmitted, or successfully transmitted, between access node 514 and each wireless device 502-506 during a time period, such as bits per second.

Based on the total bandwidth of the first frequency band in the first sector, the spectral efficiency of the first frequency band in the first sector, and the throughput provided to each of the first number of wireless devices in the first sector, a second number of wireless devices permitted to communicate with the access node over the first frequency band in the first sector is determined (operation 610). For example, the first number of wireless devices permitted to communication with access node 514 can be expressed as a total number of connected wireless devices. A connected wireless device can comprise a wireless device in active communication with access node 514 and/or a wireless device in a low power or idle mode.

The throughput provided to each of the first number of wireless devices over the first frequency band in the first sector is then adjusted to determine a third number of wireless devices permitted to communicate with the access node over the first frequency band in the first sector (operation 612). For example, to increase the number of wireless devices permitted to communicate with access node 514, a throughput provided to each of the first number of wireless devices may be decreased. Additionally, or alternatively, it may be decided to provide a certain level of throughput to each of the first number of wireless devices over the first frequency band, and the level of throughput provided to each of the first number of wireless devices may be increased, which may decrease the number of wireless devices permitted to communicate with access node 514 over the first frequency band.

Next, in operation 614, a fourth number of wireless devices in communication with an access node over the first frequency band in the second sector is determined when a loading of the first frequency band in the second sector meets a loading threshold. The loading threshold of the first frequency band in the second sector can be the same threshold, or a different threshold, as the loading threshold for the first frequency band in the first sector. As an example, a plurality of wireless devices (such as wireless devices 508-512) can use the first frequency band in the second sector to communicate with access node 514. The loading of the first frequency band in the second sector can be determined analogously to the loading of the first frequency band in the first sector.

A total bandwidth of the first frequency band in the second sector is then calculated (operation 616). The total bandwidth of the first frequency band in the second sector can vary based on, among other things, the frequency band (e.g., 800 MHz, 1.9 GHz, 2.5 GHz, and the like), the frequency spacing of channels within the frequency band, the presence and size of guard bands, a modulation scheme used for data traffic in the frequency band (e.g., time division duplexing (TDD), frequency division duplexing (FDD), and others), and so forth.

Then, based on a communication between the access node and the fourth number of wireless devices, a spectral efficiency of the first frequency band in the second sector is determined (operation 618). The communication can comprise data communications between each wireless devices 508-512 and access node 514. The data communications can comprise bearer data, control signaling, or a combination thereof. The communication can further comprise a data rate, or a throughput, between access node 314 and each wireless devices 508-512. For example, the communication can comprise a number of bits or bytes of data transmitted, or successfully transmitted, between access node 514 and each wireless devices 508-512 during a time period, such as bits per second. Based on the communication between access node 514 and each wireless device 508-512, a spectral efficiency can be determined over the first frequency band in the second sector, such as a number of bits per second transmitted over the bandwidth of the first frequency band in the second sector (e.g., bits per second divided by the total bandwidth of the first frequency band in the second sector).

Next, in operation 620, a throughput provided to each of the fourth number of wireless devices in communication with the access node in the second sector is calculated. For example, each wireless device 508, 510, and 512 can require a minimum throughput to and from access node 514. The throughput provided to each wireless device can be based on an application requirement of an application running on each wireless device. The application requirement can comprise a minimum data rate, a maximum permitted data delay, a minimum throughput, a maximum error rate, a maximum data loss rate, and the like, of an application running on a wireless device. The application requirement can also be determined based on an application type, a utilization or requested utilization of communication link resources by the application, and the like, including combinations thereof. In an embodiment, the application requirement can be expressed as a number of bits or bytes of data required to be successful transmitted, or successfully transmitted, between access node 514 and each wireless device 508-512 during a time period, such as bits per second.

Based on the total bandwidth of the first frequency band in the second sector, the spectral efficiency of the first frequency band, and the throughput provided to each of the fourth number of wireless devices, a fifth number of wireless devices permitted to communicate with the access node over the first frequency band in the second sector is determined (operation 622). For example, the fifth number of wireless devices permitted to communication with access node 514 can be expressed as a total number of connected wireless devices. A connected wireless device can comprise a wireless device in active communication with access node 514 or in a low power or idle mode.

The throughput provided to each of the fourth number of wireless devices is then adjusted to determine a sixth number of wireless devices permitted to communicate with the access node over the first frequency band in the second sector (operation 624). For example, to increase the number of wireless devices permitted to communicate with access node 514, a throughput provided to each of the fourth number of wireless devices may be decreased. Additionally, or alternatively, it may be decided to provide a certain level of throughput to each of the fourth number of wireless devices over the first frequency band in the second sector, and the level of throughput provided to each of the fourth number of wireless devices may be increased, which may decrease the number of wireless devices permitted to communicate with access node 514 over the first frequency band in the second sector.

Thus, the number of wireless devices permitted to communicate with access node 514 can be adjusted independently for each sector of access node 514, in order to improve access node performance and capacity over a frequency band on a per-sector basis, to provide a certain level of communication service quality, and to provide for a certain level of user experience.

In an embodiment, the total number of connected users permitted to communicate with an access node over a frequency band in a sector of an access node can be expressed as $$CUs_f = (BWs_f \times SEs_f \times TH)/TP_{cu}$$ [Equation 3]

where CU represents the total number of connected users permitted to communicate with an access node over a frequency band f in a sector s, BW represents the total bandwidth of frequency band f in sector s, SE represents the spectral efficiency of frequency band f in sector s, Th represents a loading threshold (which may be specific to the frequency band, the access node, or both), and $TP_{cu}$ represents the throughput provided to each connected user over frequency band f in sector s.

The total number of connected users permitted to communicate with an access node over a frequency band in a sector of an access node can be determined based on a time or time period. For example, during a time of known high network resource usage or demand, the total number of connected users permitted to communicate with an access node can be determined and used to manage the utilization and efficiency of communication resources. The total number of permitted connected users can be determined on a per-sector basis to provide a greater level of control and a higher level of efficiency of communication resource utilization. The total number of connected users can be increased per sector to provide communication resources to a larger number of wireless devices. Additionally, or alternatively, a minimum level of throughput per sector can be provided to connected users, which may place a constraint on the total number of connected users permitted to communicate with an access node in each sector.

In an embodiment, based on the foregoing, an access node or another network element can be configured to determine a total number of connected users permitted to communicate with an access node over each of a plurality of frequency bands in each of a plurality of sectors of an access node, as may be achieved through a combination of, for example, elements of communication system 300 and 500, described above. A combination of operations illustrated in FIGS. 4 and 5 can be used in such an access node or other network element. Thus, for example, for each sector of an access node, a total number of connected users permitted to communicate with an access node can be determined for two or more frequency bands used in each sector of the access node, to provide a greater level of control and a higher level of efficiency of communication resource utilization.

Figure 7:
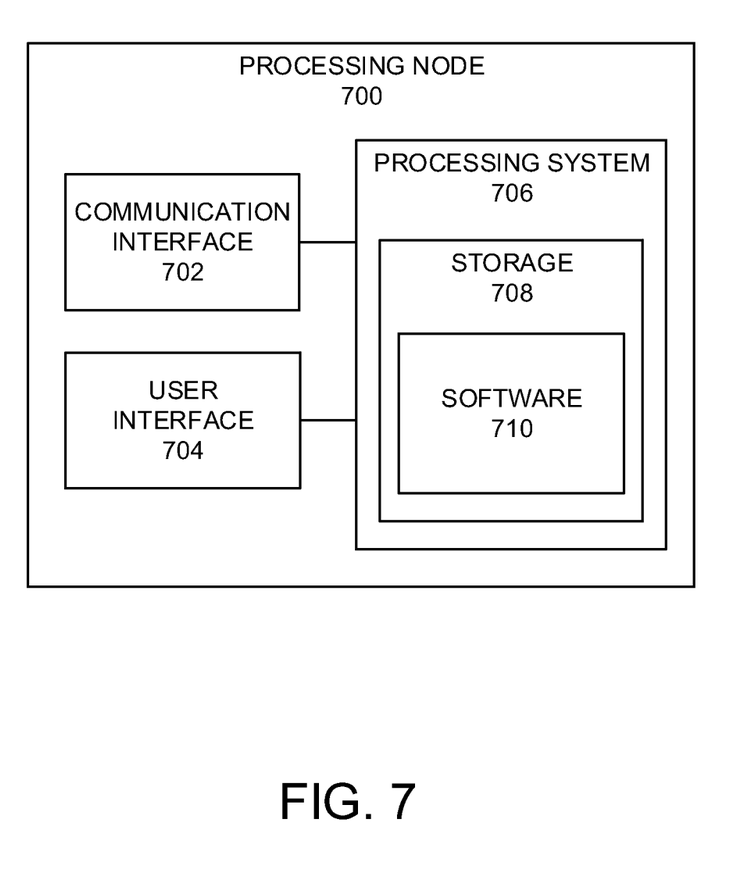
FIG. 7 illustrates an exemplary processing node.

FIG. 7 an exemplary processing node 700 in a communication system. Processing node 700 comprises communication interface 702, user interface 704, and processing system 706 in communication with communication interface 702 and user interface 704. Processing node 700 can be configured to manage connected users of a wireless communication system. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access node 108, access node 314, and access node 514. Processing node 700 can also be an adjunct or component of a network element, and can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing connected users of a wireless communication system, comprising:
   determining a first number of wireless devices in communication with an access node over a first frequency band when a loading of the first frequency band meets a loading threshold;
   calculating a total bandwidth of the first frequency band;
   determining a spectral efficiency of the first frequency band based on a communication between the access node and the first number of wireless devices;
   calculating a throughput provided to each of the first number of wireless devices in the communication between the access node and the first number of wireless devices;
   determining a second number of wireless devices permitted to communicate with the access node over the first frequency band based on the total bandwidth of the first frequency band, the spectral efficiency of the first frequency band, and the throughput provided to each of the first number of wireless devices; and
   adjusting the throughput provided to each of the first number of wireless devices to determine a third number of wireless devices permitted to communicate with the access node over the first frequency band.

2. The method of claim 1, further comprising determining the first number of wireless devices in communication of the access node over the first frequency band in a first sector of the access node.

3. The method of claim 2, further comprising calculating a total bandwidth of the first frequency band in the first sector.

4. The method of claim 2, further comprising determining a spectral efficiency of the first frequency band in the first sector based on communication between the access node and the first number of wireless devices.

5. The method of claim 1, wherein the throughput for each of the first number of wireless devices is based on an application requirement of an application running on each of the first wireless devices.

6. The method of claim 1, wherein the loading threshold further comprises a number of resource elements-per-unit time used of the first frequency band.

7. The method of claim 6, wherein the loading threshold further comprises a threshold number of the first number of wireless devices permitted to communicate with the access node.

8. The method of claim 1, further comprising determining the second number of wireless devices permitted to communicate the access node over the first frequency band in the first sector based on the total bandwidth of the first frequency band in the first sector, the spectral efficiency of the first frequency band in the first sector, and the throughput provided to each of the first number of wireless devices in the first sector.

9. The method of claim 1, further comprising adjusting the throughput provided to each of the first number of wireless devices in the first sector over the first frequency band to determine a second number of wireless devices permitted to communicate with the access node in the first sector over the first frequency band.

10. The method of claim 1, further comprising:
   determining a fourth number of wireless devices in communication with an access node over a second frequency band when a loading of the second frequency band meets a second loading threshold;
   calculating a total bandwidth of the second frequency band;
   determining a spectral efficiency of the second frequency band based on a communication between the access node and the fourth number of wireless devices;
   calculating a throughput for each of the fourth number of wireless devices of the communication between the access node and the fourth number of wireless devices;
   determining a fifth number of wireless devices permitted to communicate with the access node based on the total bandwidth of the second frequency band, the spectral efficiency of the second frequency band, and the throughput provided to each of the fourth number of wireless devices; and
   adjusting the throughput provided to each of the fourth number of wireless devices to determine a sixth number of wireless devices permitted to communicate with the access node over the second frequency band.

11. A method of managing connected users of a wireless communication system, comprising:
   determining a first number of wireless devices in communication with an access node over a first frequency band in a first sector of the access node when a loading of the first frequency band in the first sector meets a first loading threshold;
   calculating a total bandwidth of the first frequency band in the first sector;
   determining a spectral efficiency of the first frequency band in the first sector based on a communication between the access node and the first number of wireless devices;
   calculating a throughput provided to each of the first number of wireless devices in the first sector of the communication between the access node and the first number of wireless devices;
   determining a second number of wireless devices permitted to communicate with the access node over the first frequency band in the first sector based on the total bandwidth of the first frequency band in the first sector, the spectral efficiency of the first frequency band in the first sector, and the throughput provided to each of the first number of wireless devices in the first sector;

adjusting the throughput provided to each of the first number of wireless devices to determine a third number of wireless devices permitted to communicate with the access node over the first frequency band;

determining a fourth number of wireless devices in communication with the access node over the first frequency band in a second sector of the access node when a loading of the first frequency band in the second sector meets a second loading threshold;

calculating a total bandwidth of the first frequency band in the second sector;

determining a spectral efficiency of the first frequency band in the second sector based on a communication between the access node and the fourth number of wireless devices;

calculating a throughput provided to each of the fourth number of wireless devices in the second sector of the communication between the access node and the fourth number of wireless devices;

determining a fifth number of wireless devices permitted to communicate with the access node over the first frequency band in the second sector based on the total bandwidth of the first frequency band in the second sector, the spectral efficiency of the first frequency band in the second sector, and the throughput provided to each of the fourth number of wireless devices in the second sector; and adjusting the throughput provided to each of the fourth number of wireless devices to determine a sixth number of wireless devices permitted to communicate with the access node in the second sector over the first frequency band.

12. A system of managing connected users of a wireless communication system, comprising:
a processing node comprising a processor configured to:
determine a first number of wireless devices in communication with an access node over a first frequency band when a loading of the first frequency band meets a loading threshold; calculate a total bandwidth of the first frequency band; determine a spectral efficiency of the first frequency band based on a communication between the access node and the first number of wireless devices; calculate a throughput provided to each of the first number of wireless devices in the communication between the access node and the first number of wireless devices;

determine a second number of wireless devices permitted to communicate with the access node over the first frequency band based on the total bandwidth of the first frequency band, the spectral efficiency of the first frequency band, and the throughput provided to each of the first number of wireless devices; and adjust the throughput provided to each of the first number of wireless devices to determine a third number of wireless devices permitted to communicate with the access node over the first frequency band.

13. The system of claim 12, wherein the processor is further configured to determine the first number of wireless devices in communication of the access node over the first frequency band in a first sector of the access node.

14. The system of claim 13, wherein the processor is further configured to calculate a total bandwidth of the first frequency band in the first sector.

15. The system of claim 13, wherein the processor is further configured to determine a spectral efficiency of the first frequency band in the first sector based on communication between the access node and the first number of wireless devices.

16. The system of claim 12, wherein the throughput for each of the first number of wireless devices is based on an application requirement of an application running on each of the first wireless devices.

17. The system of claim 12, wherein the loading threshold further comprises a number of resource elements-per-unit time used of the first frequency band.

18. The system of claim 17, wherein the loading threshold further comprises a threshold number of the first number of wireless devices permitted to communicate with the access node.

19. The system of claim 12, wherein the processor is further configured to determine the second number of wireless devices permitted to communicate the access node over the first frequency band in the first sector based on the total bandwidth of the first frequency band in the first sector, the spectral efficiency of the first frequency band in the first sector, and the throughput provided to each of the first number of wireless devices in the first sector.

20. The system of claim 12, wherein the processor is further configured to adjust the throughput provided to each of the first number of wireless devices in the first sector over the first frequency band to determine a second number of wireless devices permitted to communicate with the access node in the first sector over the first frequency band.

* * * * *